(No Model.)
E. F. DICKEY.
FENCE.
No. 538,368.  Patented Apr. 30, 1895.
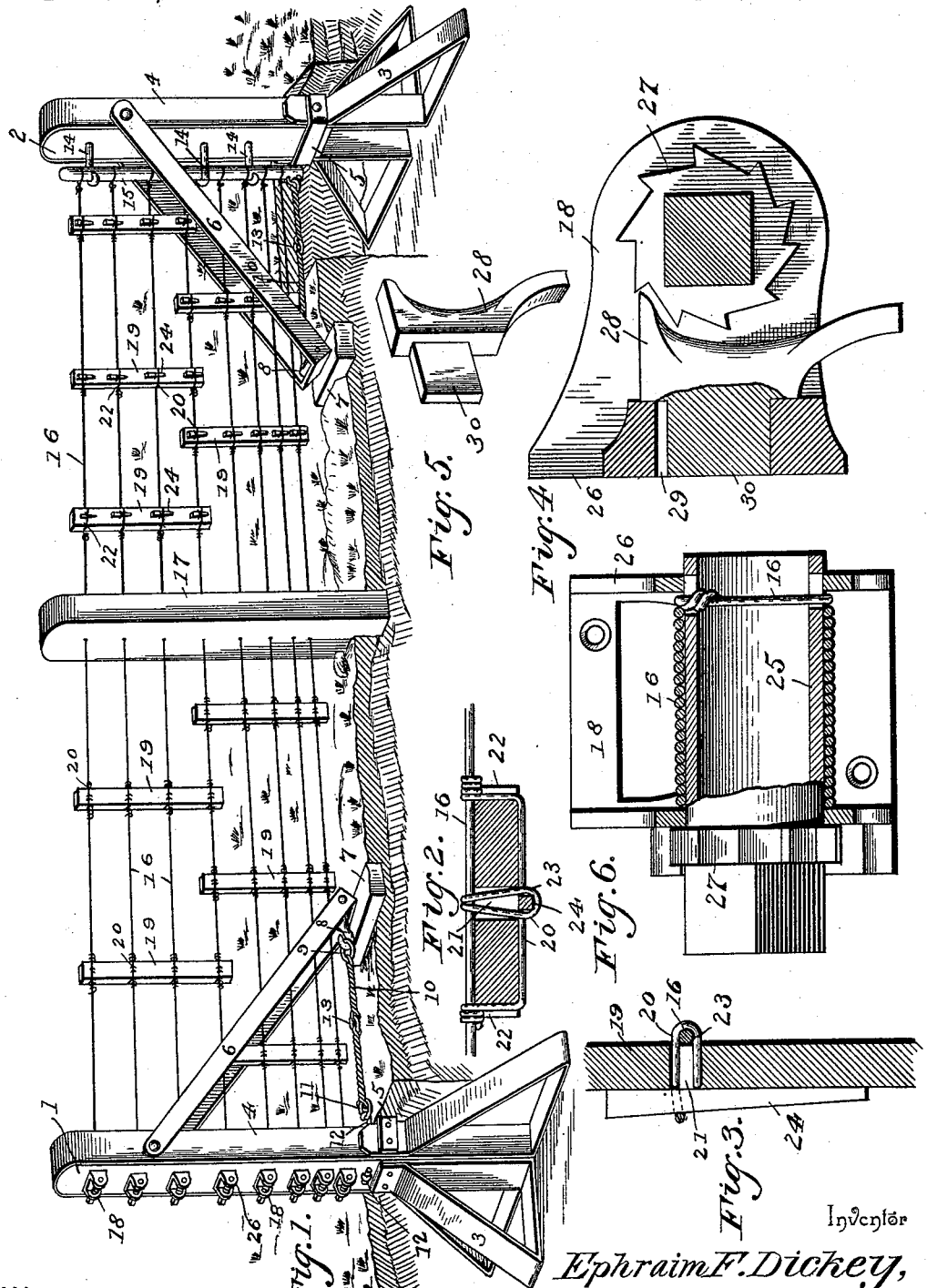
Witnesses
Julius Ulke, Jr.
N. J. Riley
Inventor
Ephraim F. Dickey,
By his Attorneys,
C. A. Snow & Co.

UNITED STATES PATENT OFFICE.

EPHRAIM F. DICKEY, OF ST. PARIS, OHIO.

FENCE.

SPECIFICATION forming part of Letters Patent No. 538,368, dated April 30, 1895.

Application filed August 14, 1894. Serial No. 520,315. (No model.)

*To all whom it may concern:*

Be it known that I, EPHRAIM F. DICKEY, a citizen of the United States, residing at St. Paris, in the county of Champaign and State of Ohio, have invented a new and useful Fence, of which the following is a specification.

The invention relates to improvements in fences.

The object of the present invention is to improve the construction of fences, to increase their strength and durability, and to enable the fence wires to be maintained at the desired tension.

The invention consists in the construction and novel combination and arrangement of parts hereinafter fully described, illustrated in the accompanying drawings and pointed out in the claim hereto appended.

In the drawings: Figure 1 is a perspective view of a fence constructed in accordance with this invention. Fig. 2 is a horizontal sectional view of a picket illustrating the manner of securing the same to the horizontal fence wires. Fig. 3 is a vertical sectional view of the same. Fig. 4 is a side elevation partly in section of one of the wire tighteners. Fig. 5 is a detail perspective view of the pawl of the wire tightener. Fig. 6 is a transverse sectional view of the wire tightener.

Like numerals of reference indicate corresponding parts in all the figures of the drawings.

1 and 2 designate similar end posts of a fence provided at their lower ends with depending triangular anchors 3, extending outward laterally and longitudinally of the fence, and designed to enable the posts to obtain a firm hold; and they may be further secured by stones, or the like, placed on or in the triangular anchors. Each post, which is preferably constructed of wood, but which may be of any desired construction, has its opposite sides and top covered by a metal frame 4, secured at the lower ends of its sides to the opposite anchors, and confined between the laterally disposed anchors by a horizontally arranged clip 5.

The post is supported by an inclined brace 6, composed of similar sides constructed of a single piece of metal, and connected at their lower ends by a cross-piece, and having their upper ends secured to opposite sides of the post. The brace is substantially rectangular, and is provided at its lower end, which is mounted on a suitable support 7, with a hook 8, into which is linked an eye 9, of a horizontal connecting wire 10, or the like, which is provided at its other end with an eye 11, to engage a hook 12 of the fence post.

The connection 10 may be of any desired construction, but it preferably consists of twisted wires having a central loop 13, into which may be inserted any suitable tool for twisting the connection to the desired tension.

The support 7 may consist of a stone, or the like, and is adapted to maintain the brace out of contact with the ground.

The post 2 is provided with horizontally disposed hooks 14, arranged in a vertical series, and receiving a vertical bar 15, to which are attached the adjacent ends of horizontal fence wires 16, and the latter are supported by an intermediate post 17, and have their other ends connected with wire tighteners 18, mounted on the end post 1. They are supported at intervals between the post by short pickets 19, arranged alternately at the top and bottom of the fence, and secured to the fence wires by wire ties 20. Each picket is provided adjacent to the fence wires with a perforation 21 and opposite notches or recesses 22, and the wire tie 20 has its terminals twisted around the fence wire, which extends across one face of the picket, and it extends over the other two faces, and is located in the side recesses or notches, whereby the picket is prevented from moving upward or downward. The wire tie is centrally doubled to form a loop 23, which is passed through the perforation of the post or picket around the fence wire embracing the latter, and it is then returned in the perforation 21. The loop projects from the picket, and is engaged by a tapering key 24, consisting of a nail, pin, or the like, and securely locking and tightly drawing the tie around the picket. The tapering key may be removed when it is desired to release the picket; and it is capable of securely holding the tie in engagement with the picket. By this construction the pickets are securely fastened to the fence wires, and the fence is greatly supported by them.

Each wire tightener consists of a frame, a drum or shaft 25 journaled in the frame 26, and provided with a ratchet 27, which is engaged by a pawl 28. The frame is composed of a back plate arranged against the post 1, and provided at its top with an opening, and sides or flanges having bearing openings to receive the shaft or drum, which has one end squared for the reception of a wrench or crank handle. The frame is provided at one side with a rectangular socket 29, formed in an enlargement or boss and located adjacent to the ratchet, and receiving a shank 30 of the pawl. The shank 30 is rectangular to conform to the configuration of the socket, and the pawl has its outer edge slightly curved, and is provided at one end with a tooth to engage the ratchet, and its other end is shaped into a handle to enable it to be disengaged from the ratchet. The socket is slightly larger than the shank of the pawl, to enable the tooth to be turned out of engagement with the ratchet. The fence wires are passed through perforations of the post 1, and are secured to the shaft or drum of the wire tightener, which is provided with a slot or perforation, for the reception of the fence wire.

It will be apparent that the fence is simple and comparatively inexpensive in construction, that it possesses great strength and durability, and that the fence wires may be readily maintained at the desired tension. It will also be seen that the pickets are securely locked to the fence wires, and are firmly secured against accidental shifting.

Changes in the form, proportion, and the minor details of construction may be resorted to without departing from the principle or sacrificing any of the advantages of this invention.

What I claim is—

In a fence, the combination of a fence wire, a picket having a perforation and provided at opposite sides with notches, a wire tie extending around and embracing the picket and arranged in the notches thereof and having its terminals coiled around the fence wire, said tie being provided with a central loop doubled and arranged in the perforation and receiving the fence wire and projecting from the picket, and a tapering key engaging the projecting portion of the loop, substantially as described.

In testimony that I claim the foregoing as my own I have hereto affixed my signature in the presence of two witnesses.

EPHRAIM F. DICKEY.

Witnesses:
DAVID E. BROWN,
JAMES M. MITCHELL.